United States Patent [19]

Warda

[11] 3,920,342
[45] Nov. 18, 1975

[54] BEARING LOCKING DEVICE

[76] Inventor: Charles W. Warda, 46 Amidon Ave., Newington, Conn. 06111

[22] Filed: May 17, 1974

[21] Appl. No.: 470,969

[52] U.S. Cl. ................ 403/352; 308/236; 403/374
[51] Int. Cl.² ........................................... F16B 2/18
[58] Field of Search ...... 308/236, 62; 403/261, 351, 403/352, 374

[56] References Cited
UNITED STATES PATENTS

| | | | |
|---|---|---|---|
| 1,201,706 | 10/1916 | Dodge | 308/236 X |
| 2,023,338 | 12/1935 | Morgan | 308/236 X |
| 2,038,121 | 4/1936 | Miller | 308/236 X |
| 2,100,725 | 11/1937 | Styri | 308/236 |
| 2,118,885 | 5/1938 | Hughes | 308/236 |
| 2,142,574 | 1/1939 | Murden | 308/236 |
| 2,837,382 | 6/1958 | Schaefer | 308/236 |
| 3,007,753 | 11/1961 | Potter | 308/236 |

FOREIGN PATENTS OR APPLICATIONS

| | | | |
|---|---|---|---|
| 1,803,193 | 6/1969 | Germany | 403/351 |

Primary Examiner—M. Henson Wood, Jr.
Assistant Examiner—Randolph A. Reese

[57] ABSTRACT

A bearing locking device assembly is provided operable for releasably locking a bearing on a shaft. The assembly consists of a bearing mountable on a shaft and a locking shoe member cooperatively associated with the bearing and operable to lock the bearing to the shaft. The bearing is substantially cylindrical in shape and has a bore formed internally thereof. The bore of the bearing is provided with inclined sidewalls at one end thereof. The latter sidewalls are inclined inwardly beginning at the outer edge of the end of the bore and extending inwardly into the bore for a relatively short distance thereby to provide a radially extending shoulder within the bore adjacent one end thereof. The radial shoulder is eccentric in that the width thereof varies from a maximum dimension on one side of the bore to a minimum dimension on the opposing side of the bore. The locking shoe member in accord with one embodiment thereof is generally arcuate in configuration and has a length which is slightly longer than the diameter of the bore of the bearing. The outer surface of the locking shoe member is inclined at an angle which is the complement of the angle at which the aforereferenced sidewalls of the bore of the bearing are inclined. In addition, the thickness of the locking shoe member varies from a maximum at the center thereof to a minimum at each end thereof. Moreover, the thickness of the locking shoe member corresponds to the width of the radial shoulder formed in the bore of the bearing. Namely, the maximum thickness of the locking shoe member is substantially equivalent to the maximum width of the radial shoulder and the minimum thickness of the locking shoe member is substantially equivalent to the minimum width of the radial shoulder. Preferably, internally the locking shoe member is provided with a knurled surface for purposes of improving the gripping action thereof. In accord with the mode of operation of the bearing locking device assembly, the locking shoe member is first inserted into the bore of the bearing so as to be supported on the radial shoulder of the latter. With the bearing and locking shoe member so assembled, the bearing is mounted on the shaft. To lock the bearing to the shaft the former is rotated manually relative to the latter. The effect of this rotation is to cause the locking shoe member to become wedged between the inner surface of the bore of the bearing and the circumference of the shaft thereby locking the bearing to the shaft. To unlock the bearing, the latter need merely be rotated in the opposite direction relative to the shaft.

7 Claims, 14 Drawing Figures

BEARING LOCKING DEVICE

BACKGROUND OF THE INVENTION

It has been known heretofore to provide assemblies which are intended to function as locking means for locking a bearing on a shaft. In this regard, it is found that in general the locking assemblies which have been known heretofore are characterized by the fact that they commonly differ one from another insofar as concerns the nature of the construction thereof. For example, one form of such a prior art locking assembly constitutes the subject matter of U.S. Pat. No. 1,650,573. The latter patent teaches a method of locking a bearing on a shaft which requires that the shaft be provided with an eccentric portion. In accord therewith, a ring which comprises a portion of the bearing is seated on the main portion of the shaft. The aforesaid ring and thereby the bearing is locked to the shaft by means of a collar which is positioned on the eccentric portion of the shaft. The ring and the collar are provided with interfitting portions. Thus, with the ring and collar in engagement with each other, if the ring and collar are rotated slightly, relative to each other, the eccentric formation of the shaft and of the interfitting parts on the ring and collar will cause the latter two members to bind or lock tightly to each other and will cause them to be tightly wedged and held to their respective shaft portions. Such a locking assembly is disadvantageously characterized in that it is restricted in use to one particular type of shaft, i.e., a shaft embodying an eccentric portion. Moreover, the cost of providing the shaft with such an eccentric portion represents an additional expense of manufacture. Also, the locking assembly itself has a relatively complex construction which in turn is costly to manufacture and assemble.

The subject matter of U.S. Pat. No. 2,038,121 is directed to another prior art form of locking assembly. More particularly, there is shown therein a means of locking a bearing on a shaft which differs in construction from that described in the preceding paragraph. In accord with the teachings of U.S. Pat. No. 2,038,121, the inner ring of the bearing is provided with an extension at one end. Spaced inwardly of the outer end of the latter extension there is formed in the bore a groove having radially disposed sides and a bottom which is formed eccentrically in relation to the wall of the bore whereby in cross section the groove has a substantially U-shaped configuration. A locking shoe is designed to be located within the groove so that it may readily move into the deeper portion of the groove and in such position that upon relative angular movement of the parts the shoe will be jammed between the perimeter of the shaft and the bottom of the groove. The locking shoe is in the form of an eccentric ring the thickest portion of the ring being at the center thereof and with its outer surface sloping from the center portion towards both ends. For holding the shoe in the groove for purposes of handling and assembly, the shoe is extended at the respective ends into tails serving as keeper springs, which are of sufficient length that, by their tendency to expand, they keep the shoe in the groove. An opening is cut from the end of the bearing ring into the shallowest portion of the groove to serve two purposes, namely, through the use of a suitable feeler inserted into the opening as a means of making sure that the shoe is in approximately the deepest portion of the groove, and also when it is desired to dismount the bearing from the shaft a feeler may be slid into the opening and caused to press upon one of the tails and facilitate loosening it. Although the aforesaid locking assembly possesses significant advantages over the locking assembly described in the preceding paragraph insofar as concerns cost of manufacture and assembly, the former nevertheless has been put to very little actual use. The primary reason for this is that once the bearing has been locked to the shaft through the use of the locking assembly, it is very difficult to unlock the bearing relative to the shaft for purposes of removing the bearing from the shaft. In this regard, the opening provided for this purpose in the bearing ring has proven when employed in conjunction with a feeler to be very ineffectual for purposes of initiating relative movement between the bearing ring and the locking shoe wedged between the former and the shaft.

A third patent which exemplifies the nature of construction of prior art locking assemblies is U.S. Pat. No. 2,100,725. As shown therein, an eccentric groove is provided in the bore of the inner ring of a two-row ball bearing with the center portion of the groove being deeper than its sides and with the groove being located in the median portion in respect to the ball raceways so that the deepest part of the groove in the bore of the bearing is directly below the center land. The form of the groove is that of two flat truncated hollow cones set base to base. The shoe which is made from spring material is formed on a curvature, the curve of the inner face being of less radius than the radius of the shaft and the curve of the outer surface of greater radius than the bore of the bearing. In addition, the outer surface is formed so as to have conical faces capable of mating with the conical faces of the groove. The locking device is designed so that the locking function is accomplished upon slight relative axial movement of the parts. The major disadvantage of this type of locking assembly is that to form a groove in the bore of the bearing having the configurations required for this type of locking assembly is undesirable in that it is difficult to do and consequently adds to the cost of manufacture thereof. Similarly, to provide the locking shoe with the conical faces required thereby in order to be operable in this type of locking assembly is also costly.

Therefore, although the prior art evidences the fact that it has long been known to employ locking assemblies for locking a bearing on a shaft, and that there has been some attempts at making improvements in the construction of prior art locking assemblies, it is also to be noted from the above that such attempts have resulted in providing assemblies which still possess undesirable features. There has thus existed a need to provide a locking assembly which would overcome the disadvantages possessed by prior art forms of locking assemblies described hereinabove as well as possessing other advantages relating to construction and method of employment.

Accordingly, it is an object of the present invention to provide a novel and improved bearing locking device assembly which is operable for locking a bearing on a shaft.

It is another object of the present invention to provide such a bearing locking device assembly wherein a locking shoe member is employed to provide the desired locking action.

A further object of the present invention is to provide such a bearing locking device assembly wherein a locking shoe member having an inclined outer surface is cooperatively associated with a bearing having a bore in which a groove is formed, the sidewalls of which are inclined at an angle which is the complement of the angle at which the outer surface of the locking shoe member is inclined.

A still further object of the present invention is to provide such a bearing locking device assembly which is compatible for use in mounting bearings on shafts of conventional construction.

Yet another object of the present invention is to provide such a bearing locking device assembly which is easy to employ and which enables a bearing which has been locked on a shaft through the use thereof to be readily released from a locked condition relative to the shaft.

Yet still another object of the present invention is to provide such a bearing locking device assembly which is capable of effectively locking a bearing on a shaft, yet is relatively inexpensive to manufacture.

SUMMARY OF THE INVENTION

It has now been found that the foregoing and related objects can be readily attained in a bearing locking device assembly which is operable for releasably locking a bearing on a shaft. The assembly consists of a bearing mountable on a shaft and a locking shoe member cooperatively associated with the bearing. The bearing is substantially cylindrical in shape and has a bore formed at the center thereof. Internally of the bore there is provided a groove extending inwardly a short distance from one end of the bearing. The groove is eccentric in that the width thereof varies from a maximum dimension on one side of the bore to a minimum dimension on the opposing side of the bore. The locking shoe member in accord with one embodiment thereof is generally arcuate in configuration and has a length which is slightly longer than the diameter of the bore of the bearing. The outer surface of the locking shoe member is inclined at an angle which is the complement of the angle at which the aforereferenced sidewalls of the bore of the bearing are inclined. In accord with the mode of operation of the bearing locking device assembly, the locking shoe member is first inserted into the bore of the bearing so as to be supported in the groove of the latter. With the bearing and locking shoe member so assembled, the bearing is mounted on the shaft. To lock the bearing to the shaft the former is rotated manually relative to the latter. The effect of this rotation is to cause the locking shoe member to become wedged between the inner surface of the bore of the bearing and the circumference of the shaft thereby locking the bearing to the shaft. To unlock the bearing, the latter need merely be rotated in the opposite direction relative to the shaft.

In accord with the preferred embodiment of the invention the bore of the bearing is provided with inclined sidewalls at one end thereof. The latter sidewalls are inclined inwardly beginning at the outer edge of the end of the bore and extending inwardly into the bore for a relatively short distance thereby to provide a radially extending shoulder within the bore adjacent one end thereof. The radial shoulder is eccentric in that the width thereof varies from a maximum dimension on one side of the bore to a minimum dimension on the opposing side of the bore. The thickness of the locking shoe member varies from a maximum at the center thereof to a minimum at each end thereof. Moreover, the thickness of the locking shoe member corresponds to the width of the radial shoulder formed in the bore of the bearing. Namely, the maximum thickness of the locking shoe member is substantially equivalent to the maximum width of the radial shoulder and the minimum thickness of the locking shoe member is substantially equivalent to the minimum width of the radial shoulder. Preferably, internally the locking shoe member is provided with a knurled surface for purposes of improving the gripping action thereof.

DETAILED DESCRIPTION OF THE ILLUSTRATED EMBODIMENTS

Figure 1:
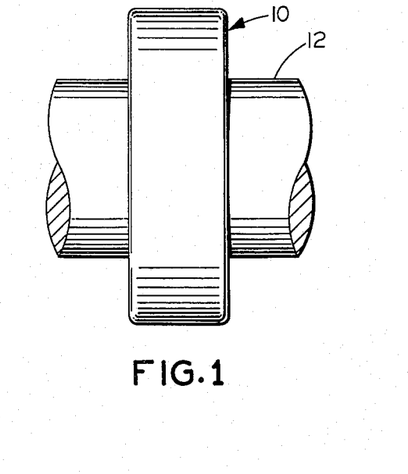
FIG. 1 is a side elevational view of a bearing locking device assembly constructed in accordance with the present invention.
Figure 2:
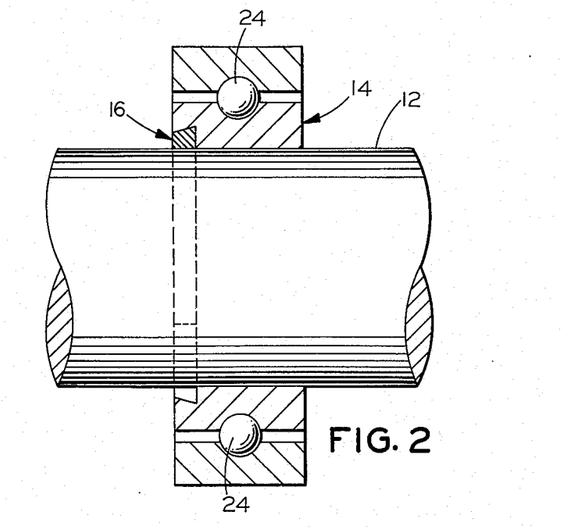
FIG. 2 is a cross sectional view on an enlarged scale of a bearing locking device assembly constructed in accordance with the present invention.
Figure 3:
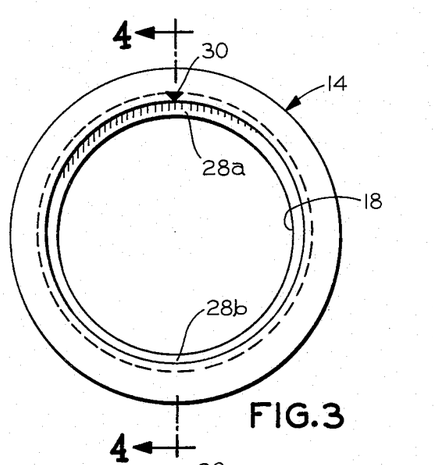
FIG. 3 is an end view of the bearing of a bearing locking device assembly constructed in accordance with the present invention.

Referring now to the drawings, and more particularly FIGS. 1 and 2 thereof there is illustrated therein a bearing locking device assembly, generally designated by reference numeral 10, constructed in accordance with the present invention and depicted in the drawings mounted on a shaft 12 of conventional construction. For purposes of the following description of the present invention, one form of shaft 12 has been chosen for illustration in the drawings. However, it is to be understood that the bearing locking device assembly 10 of the present invention is capable of being employed with other types of shafts (not shown) differing from the shaft 12 as to size and/or configuration. More particularly, the bearing locking device assembly 10 in accord with the present invention is intended to be operable with any conventional form of cylindrical shaft as well as any shaft which embodies at least a portion thereof which is substantially cylindrical in cross section.

The bearing locking device assembly 10 of the present invention consists of a bearing, generally designated by reference numeral 14, and a locking shoe member generally designated by reference numeral 16. With reference to FIGS. 1-8 of the drawings, a detailed description will now be set forth of one embodiment of a bearing locking device assembly, i.e., the assembly 10, constructed in accordance with the present invention, and one embodiment of a locking shoe member, i.e., the member 16 which is operatively included therein.

Figure 4:
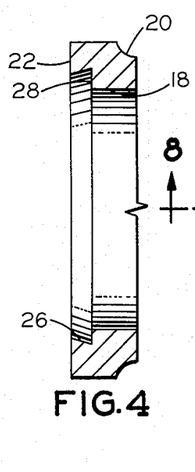
FIG. 4 is a cross sectional view of the bearing of a bearing locking device assembly constructed in accordance with the present invention taken substantially on the line 4—4 in FIG. 3.

Referring now more particularly to FIGS. 2 and 4 of the drawings, the bearing 14 as found illustrated therein is generally cylindrical in configuration, and has a bore 18 formed at the center thereof. The latter bore 18 is suitably dimensioned so as to conform to the diameter of the shaft 12 on which it is intended to utilize the bearing 14. In a manner which is well known to those skilled in the bearing art, the bearing 14 also includes a raceway 20 suitably formed in conventional fashion within the body 22 of the bearing 14. A multiplicity of balls 24, only two of which are visible in FIG. 2 of the drawings, are suitably held captive in the raceway 20 in known fashion. Inasmuch as the manner in which the bearing 14 is utilized to perform the bearing function is only indirectly related to the subject matter of the present invention, it is not deemed necessary for purposes of obtaining an understanding of the present invention to describe in detail such function hereinafter or to set forth with more particularity the nature of the construction of the raceway 20 and the manner in which the balls 24 are retained therein. Instead, it should merely be noted at this point that the bearing 14 embodies a construction generally similar to that of conventional forms of bearings with the differences which exist therebetween being identified with more particularity hereinafter.

Continuing with a description of the bearing 14, the latter as best understood with reference to FIG. 4 of the drawings differs from the conventional form of bearing provided heretofore in that the bore 18 of the bearing 14 is configured differently. More specifically, the bore 18 of the bearing 14 is provided with inclined sidewalls 26 at one end thereof. The latter sidewalls 26 are inclined inwardly beginning at the outer edge of the end of the bore 18 and extending inwardly into the bore 18 for a relatively short distance thereby to provide a radially extending shoulder 28 within the bore 18 adjacent one end thereof. As best seen with reference to FIG. 3 of the drawings, for a purpose yet to be described, the radial shoulder 28 is eccentric in that the width thereof varies from a maximum dimension at a point 28a on one side of the bore 18 to a minimum dimension at a point 28b on the opposing side of the bore 18. Completing the description of the structure of the bearing 14, it will be noted with reference to FIG. 3 of the drawings that the bearing 14 preferably is provided with a triangularly shaped mark 30 formed on the end wall of the bearing 14 adjacent the end of the bore 18 whereat the radial shoulder 28 is formed. The mark 30 functions to identify the side of the bore 18 whereat the radial shoulder 28 is of maximum width. Although the mark 30 has been depicted in the drawings as taking the form of a triangle it is, of course, to be understood that marks having other different configurations could equally well be employed, or the identifying function performed by the mark 30 could also be provided by some other form identifying means such as a notch formed in the end wall of the bearing 14, etc., without departing from the essence of the invention.

Figure 6:
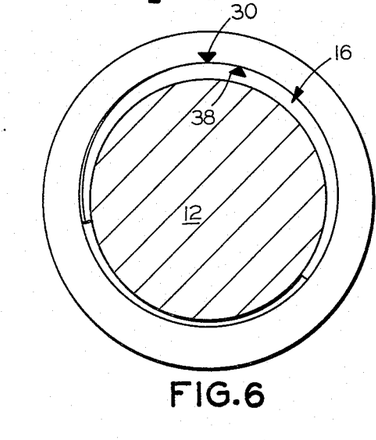
FIG. 6 is an end view of the bearing and locking shoe member of a bearing locking device assembly constructed in accordance with the present invention illustrated assembled on a shaft, the latter being shown in cross section and the bearing and locking shoe member occupying a second position relative to each other.
Figure 7:
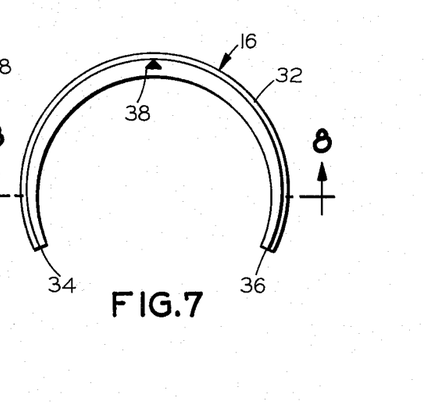
FIG. 7 is an end view of the locking shoe member of a bearing locking device assembly constructed in accordance with the present invention.
Figure 8:
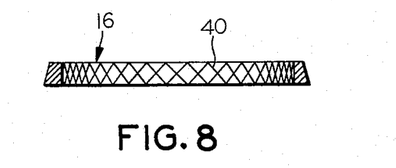
FIG. 8 is a cross sectional view of the locking shoe member of a bearing locking device assembly constructed in accordance with the present invention taken substantially in the line 8—8 in FIG. 7.

Turning now to a consideration of the locking shoe member 16, the latter as best understood with reference to FIG. 7 of the drawings, has a generally horseshoe-like configuration. More specifically, the locking shoe member 16 in accord with the embodiment thereof illustrated in FIGS. 1-8 of the drawings is generally arcuate in configuration and has a length which measured from tip to tip is slightly longer than one-half of the circumference of the radial shoulder 28. The outer surface 32 of the locking shoe member 16 as seen in FIG. 8 of the drawings is inclined at an angle which is the complement of the angle at which the sidewalls 26 of the bore 18 of the bearing 14 are inclined. In addition, the thickness of the locking shoe member 16 varies from a maximum at the center thereof to a minimum at each end thereof. Moreover, the thickness of the locking shoe member 16 corresponds to the width of the radial shoulder 28 formed in the bore 18 of the bearing 14. Namely, the maximum thickness of the locking shoe member 16 is substantially equivalent to the maximum width at the point 28a of the radial shoulder 28 and the minimum thickness of the locking shoe member 16 is substantially equivalent to the minimum width of the radial shoulder 28, i.e., at the point 28b thereof.

Completing the description of the locking shoe member 16, the latter as shown in FIG. 8 of the drawings preferably is provided with a knurled surface 40 on the inside thereof. The knurled surface 40 functions to provide a better gripping action between the inner surface of the locking shoe member 16 and the circumference of the shaft 12 when the bearing locking device assembly 10 of the present invention is assembled on the latter as will be described more fully hereinafter. Furthermore, as depicted in FIG. 7 of the drawings, the locking shoe member 16 preferably is also provided with a triangularly shaped mark 38 formed on the sidewall of the locking shoe member 16 at the center thereof. The mark 38 on the locking shoe member 16 is intended to cooperate with the mark 30 on the bearing 14 in a manner which will be described subsequently.

Figure 5:
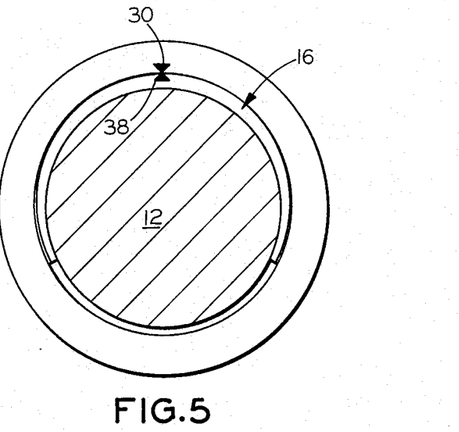
FIG. 5 is an end view of the bearing and locking shoe member of a bearing locking device assembly constructed in accordance with the present invention illustrated assembled on a shaft, the latter being shown in cross section and the bearing and locking shoe member occupying a first position relative to each other.

There will now be set forth in conjunction with reference particularly to FIGS. 5 and 6 of the drawings, a description of the manner in which the bearing locking device assembly 10 of the present invention is intended to be employed. With the locking shoe member 16 and the bearing 14 being disassembled, the first step is to assemble these two elements. To do this, the mark 38 on the locking shoe member 16 is aligned generally with the mark 30 on the bearing 14. The ends 34 and 36 of the locking shoe member 16 are then inserted into the bore 18 of the bearing 14 so that the former rests on the radial shoulder 28. Thereafter, merely by applying pressure with one's fingers substantially at the center of the locking shoe member 16, i.e., adjacent the marks 38 thereon, the member 16 may be snapped into the bore 18 so that the locking shoe member 16 is seated on the radial shoulder 28. Once the locking shoe member 16 and the bearing 14 have been cooperatively associated in the aforedescribed manner, they will remain so assembled, i.e., the locking shoe member 16 will not fall out of the bore 18, even if the bearing 14 is turned upside down, etc. The reason for this is that by virtue of the fact that the length of the locking shoe member 16 is longer than one-half of the circumference of the radial shoulder 28, the distance from the end 34 to the end 36 measured transversely therebetween is greater than the corresponding transverse distance measured between the sidewalls of the bore 18. In this regard, it should be noted that in contradistinction to prior art forms of locking shoe members, the ends 34 and 36 of the locking shoe member 16 are not constructed so as to inherently be spring biased into engagement with the inclined sidewalls 26 when the locking shoe member 16 is seated on the radial shoulder 28. After the bearing 14 and the locking shoe member 16 have been so assembled to form the bearing locking device assembly 10 of the present invention, the latter assembly 10 is mounted on the shaft 12. To this end, as noted previously, the bore 18 is suitably dimensioned so that the diameter thereof corresponds to the diameter of the shaft 12 whereby the assembly 10 is capable of being slid on the shaft 12 until the assembly 10 is suitably located thereon so that the desired relationship exists between the assembly 10 and the shaft 12. In this connection, it should be noted that the mark 38 on the locking shoe member 16 and the mark 30 on the bearing 14 should be substantially in alignment when the assembly 10 is being slid on the shaft 12 so as to ensure that clearance exists between the inner circumference of the locking shoe member 16 and the external surface of the shaft 12. FIG. 5 illustrates the relationship which exists between the assembly 10 and the shaft 12 after the former has been mounted on the latter in the aforedescribed manner. To lock the bearing 14 on the shaft 12, the former is rotated manually relative to the latter. The rotation of the bearing 14 may be either in a counterclockwise direction so that the mark 30 on the bearing 14 and the mark 38 on the locking shoe member 16 are no longer in alignment, i.e., bear the relationship depicted in FIG. 6 of the drawings, or in a clockwise direction. The effect of this rotation is to cause the locking shoe member 16 to become wedged between the sidewalls 26 of the bearing 14 and the circumference of the shaft 12 as shown in FIG. 6 of the drawings. More particularly, this wedging action is accomplished by virtue of the eccentricity of the radial shoulder 28. Namely, as the bearing 14 is rotated, relative movement occurs between the bearing 14 and the locking shoe member 16 so that the center of the latter which comprises the thickest portion of the locking shoe member 16 no longer is aligned with the portion 28a of the radial shoulder 28 which constitutes the widest portion of the latter. Consequently, a portion of the locking shoe member 16 adjacent either the end 34 or the end 36 thereof, depending upon in which direction the bearing 14 has been rotated, projects into the bore 18 of the bearing 14 thereby reducing the dimension thereof and causing the bearing 14, the locking shoe member 16 and the shaft 12 to be held tightly together as a unit. The gripping action of the locking shoe member 16 is enhanced by providing the latter with the knurled surface 40 to which reference has been had previously hereinabove. The knurled surface 40 is operable to provide a multiplicity of gripping points engageable with the circumference of the shaft 12, i.e., performs the function commonly intended therefor. To unlock the bearing 14 from the shaft 12, the above described procedure is merely reversed. Namely, the bearing 14 is manually rotated in the direction opposite to that in which the bearing 14 was previously rotated for purposes of locking the bearing 14 on the shaft 12, i.e., if the bearing 14 was previously rotated in a counterclockwise direction, the bearing 14 is now rotated in a clockwise direction to unlock the latter or if the bearing 14 had been rotated in a clockwise direction, the bearing 14 is now rotated in a counterclockwise direction. This rotation of the bearing 14 is continued until the mark 30 on the bearing 14 and the mark 38 on the locking shoe member 16 are once again substantially in alignment, i.e., bear the relationship which is shown in FIG. 5 of the drawings. With the bearing 14 and the locking shoe member 16 so aligned, the bearing locking device assembly 10 may be slid off the shaft 12. If it is desired to disassemble the bearing 14 and the locking shoe member 16, this may be accomplished by first ensuring that the mark 30 on the bearing 14 and the mark 38 on the locking shoe member 16 are substantially in alignment and then by inserting one's fingers into the bore 18, grasping the center of the locking shoe member 16, i.e., adjacent the mark 38, and pulling the locking shoe member 16 in an upwardly and outwardly direction the locking shoe member 16 may be pulled out of the bore 18 of the bearing 14.

Figure 9:
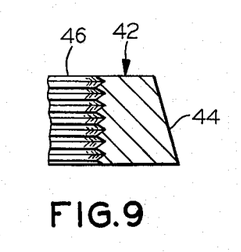
FIG. 9 is a cross sectional view of a portion of a locking shoe member of a bearing locking device assembly constructed in accordance with the present invention depicting the roughened internal surface of the locking shoe member.

Referring now to FIG. 9 of the drawings, there is shown therein a portion of another embodiment of locking shoe member which has been designated generally by reference numeral 42, and which is capable of being employed in the bearing locking device assembly 10. The locking shoe member 42 is generally similar in construction to the locking shoe member 16 in that the former is provided with an inclined outer surface 44 which is identical to the surface 32 of the locking shoe member 16. More specifically, essentially the only difference between the locking shoe member 42 and the locking shoe member 16 resides in the nature of the configuration of the internal surface thereof. Namely, whereas the locking shoe member 16 embodies the knurled surface 40 as depicted in FIG. 8 of the drawings, the locking shoe member 42 is provided with a thread-like roughened surface 46 as shown in FIG. 9. The purpose of including the illustration of the locking shoe member 42 in the drawings is merely to evidence the fact that the inner surface of the locking shoe member may take some form other than the knurled surface 40 without departing from the essence of the invention.

Figure 10:
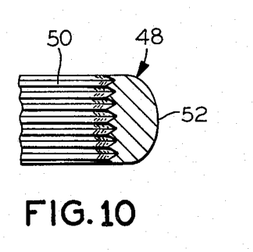
FIG. 10 is a cross sectional view of a portion of another embodiment of locking shoe member of a bearing locking device assembly constructed in accordance with the present invention.

With reference to FIG. 10 of the drawings, there is depicted therein a portion of still another embodiment of locking shoe member, which has been designated generally by the reference numeral 48 and which is intended to be capable of being employed in a bearing locking device assembly constructed in accordance with the present invention. The locking shoe member 48 is similar to the locking shoe member 42 in that they both embody the same type of roughened inner surface, i.e., the roughened surface 46 as shown in FIG. 9 of the drawings for the locking shoe member 42 and the roughened surface 50 as shown in FIG. 10 for the locking shoe member 48. However, the locking shoe member 48 differs from both the locking shoe member 16 and the locking shoe member 42 insofar as concerns the configuration of the outer surface thereof. Namely, as depicted in FIG. 10 of the drawings, the locking shoe member 48 embodies an outer surface 52 which is arcuate in configuration rather than inclined as are the outer surfaces 32 and 46 of the locking shoe members 16 and 42, respectively. More particularly, the outer surface 52 of the locking shoe member 48 has a generally oval shape. The purpose of depicting in the drawings the locking shoe member 48 is merely to exemplify the fact that the outer surface of the locking shoe member need not be limited solely to an inclined surface. It is, of course, to be understood that where the outer surface of the locking shoe member is configured in the manner of the outer surface 52 of the locking shoe member 48, the bearing (not shown) with which the locking shoe member 48 is to be cooperatively associated must have a bore wherein a portion thereof is configured similarly to the outer surface 52, i.e., wherein the sidewalls of the aforereferenced portion of the bore are arcuate in configuration with the radius thereof corresponding to the radius of the outer surface 52 of the locking shoe member 48 rather than being inclined as are the sidewalls 26 of the bearing 14. Moreover, rather than being planar as is the radial shoulder 28 of the bearing 14, the shoulder formed by the intersection of the arcuate sidewalls and the bore of the bearing would be curvilinear in shape.

Figure 11:
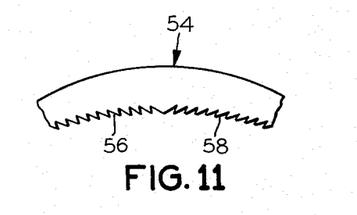
FIG. 11 is a top plan view of a portion of still another embodiment of locking shoe member of a bearing locking device assembly constructed in accordance with the present invention.

A portion of yet another embodiment of locking shoe member, generally designated by reference numeral 54, capable of being employed in a bearing locking device assembly constructed in accordance with the present invention is depicted in FIG. 11 of the drawings. Although not visible in the drawing, the outer surface of the locking shoe member 54 may embody either an oval configuration similar to the outer surface 52 of the locking shoe member 48 or an inclined configuration similar to the outer surfaces 32 and 44 of the locking shoe members 16 and 42, respectively. The locking shoe member 54 differs from any of the other locking shoe members, i.e., the members 16, 42 and 48, described previously insofar as concerns the nature of the configuration of the inner surface thereof. More particularly, as seen with reference to FIG. 11, the inner surface of the locking shoe member 54 is configured in such a manner as to include a first portion 56 of teeth-like projections pointing in a first direction and a second portion 58 of teeth-like projections pointing in a second direction. By so configuring the inner surface of the locking shoe member 54, it is intended to provide the former with a first portion 56 which is operable for tightly engaging the circumference of the shaft 12 when the bearing (not shown) with which the locking shoe member 54 is cooperatively associated is rotated in a first direction and with a second portion which is designed to be operable to provide the gripping action when the bearing (not shown) is rotated in the opposite direction.

Inasmuch as each of the locking shoe members 42, 48 and 54 is intended to be cooperatively assembled with a corresponding suitably configured bearing (not shown) in the same manner as the locking shoe member 16 is assembled with the bearing 14, it is not deemed necessary to provide a description herein of the method of assembly of these components. Likewise, since the bearing locking device assembly resulting from the assembly of each of the locking shoe members 42, 48 and 54 with a corresponding suitably configured bearing (not shown) is mounted on the shaft 12 and is operable to perform a locking function relative thereto in the same manner as has been set forth hereinabove in detail in connection with the description of the mounting of the bearing locking device assembly 10 on the shaft 12 and the manner in which the assembly 10 is utilized thereon, it is deemed unnecessary to reiterate at this point the manner in which such bearing locking device assemblies are employed.

Figure 12:
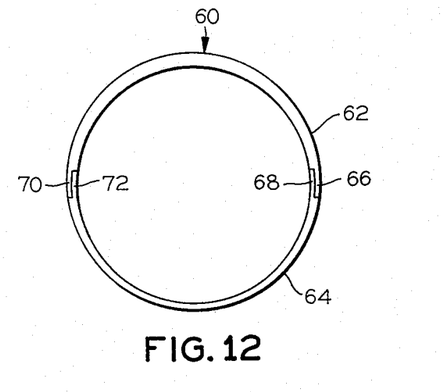
FIG. 12 is an end view of the locking shoe member of a second embodiment of bearing locking device assembly constructed in accordance with the present invention.

Referring now to FIG. 12 of the drawings, there is illustrated therein the locking shoe member, generally designated by reference numeral 60, of another embodiment of bearing locking device assembly, constructed in accordance with the present invention. The locking shoe member 60 differs from the locking shoe members 16, 42, 48 and 54 which have been described previously hereinabove in that the member 60 is of two-part construction. Namely, the locking shoe member 60 includes a pair of substantially identically constructed sections 62 and 64. The latter sections 62 and 64 are each generally similar in construction to the locking shoe member 16 of the bearing locking device assembly 10 described previously herein differing therefrom in two respects. First, it will be readily apparent with reference to FIG. 12 that each of the sections 62 and 64 is shorter in length than is the locking shoe member 16. More specifically, whereas as has been described above the length of the locking shoe member 16 measured from tip to tip is slightly greater than one-half of the circumference of the radial shoulder 28, each of the sections 62 and 64 of the locking shoe member 60 on the other hand is substantially equal to one-half of the circumference of the radial shoulder 28. The other major difference in construction between the locking shoe member 60 and the locking shoe member 16 for example, resides in the nature of the configuration of the ends of each of the sections 62 and 64 of the former. As will be understood with reference to FIG. 12 of the drawings, the ends of the sections 62 and 64 are configured in such a manner that they interlock when brought into engagement with each other. More particularly, the sections 62 and 64 are both configured so that each end thereof is provided with a cutout portion. For example, with reference first to the section 62, the latter is provided with a cutout portion at each end thereof whereby the ends 66 and 70 thereof are substantially L-shaped in configuration. Similarly, the section 64 is also provided with a cutout portion at each end thereof whereby the ends 68 and 72 thereof are substantially L-shaped in configuration. As shown in FIG. 12 of the drawings, when the ends of the sections 62 and 64 are brought into engagement the end 66 of the section 62 mates with the end 68 of the section 64 and the other end, i.e., end 70, of section 62 mates with the other end, i.e., end 72, of section 64. Insofar as concerns the nature of the configuration of the outer surfaces of the sections 62 and 64, these surfaces may take the form of the inclined surface 32 of the locking shoe member 16 or the oval configuration of the outer surface 52 of the locking shoe member 48 without departing from the essence of the invention. Moreover, with regard to the inner surfaces of the sections 62 and 64, these may be provided with a structure similar to that of any of the locking shoe members, i.e., members 16, 42, 48 and 54 which have been described previously hereinabove. Although not shown in the drawings, it is to be understood that preferably the section 62 of the locking shoe member 60 is provided with a mark similar to the mark 38 of the locking shoe member 16 which is intended to function in the same manner as the latter, i.e., to provide an index cooperable with a corresponding mark provided on the bearing with which the locking shoe member 60 is designed to be associated to form a bearing locking device assembly constructed in accordance with the present invention.

Continuing with a description of the locking shoe member 60 of FIG. 12, the member 60 may be employed with a bearing (not shown) which embodies generally the same construction as the bearing 14 which has been described in detail hereinabove. Namely, the bearing (not shown) with which the locking shoe member 60 is intended to be cooperatively associated should be provided at one end of the bore thereof with a recessed portion providing a shoulder spaced inwardly slightly from the aforesaid one end of the bore which is operable to enable the locking shoe member 60 to be seated thereon in the manner in which the locking shoe member 16 is seated on the radial shoulder 28 of the bearing 14. As is to be expected, because of the differences in construction which exist between the locking shoe member 16 and the locking shoe member 60, the method by which the latter is cooperatively associated with a bearing (not shown) differs in some respects from the method employed to assemble the locking shoe member 16 with the bearing 14. To this end, the following procedure may be followed to assemble the locking shoe member 60 with a bearing (not shown). The section 64 of the locking shoe member 60 may be selected for insertion first into the bore of the bearing (not shown) so that the section 64 rests on the shoulder formed in the bore for this purpose. With the section 64 so positioned, the ends 66 and 70 of the section 62 are inserted into the bore of the bearing (not shown) so that they are located in juxtaposed relation to the ends 68 and 72 of the section 64. By applying pressure with one's fingers against the outer surface of the section 62 at the center thereof, the latter may be snapped into place, i.e., so that the section 62 also rests on the shoulder formed in the bore of the bearing (not shown) with the ends 66 and 70 of the section 62 in mating engagement with the ends 68 and 72 of the section 64. To facilitate the latter assembly, the mark (not shown) with which the section 62 is provided is first aligned with a similar mark with which the bearing (not shown) is preferably provided. With the locking shoe member 60 and the bearing (not shown) so assembled, the bearing locking device assembly produced thereby may be slid on the shaft 12 in the same manner as has been described hereinabove for the bearing locking device assembly 10. Moreover, the bearing locking device assembly of which the locking shoe member 60 comprises one part thereof is operable in the same manner as the bearing locking device assembly 10 to lock a bearing on the shaft 12. Thus, it is not deemed necessary to reiterate here the method of employment thereof.

Figure 13:
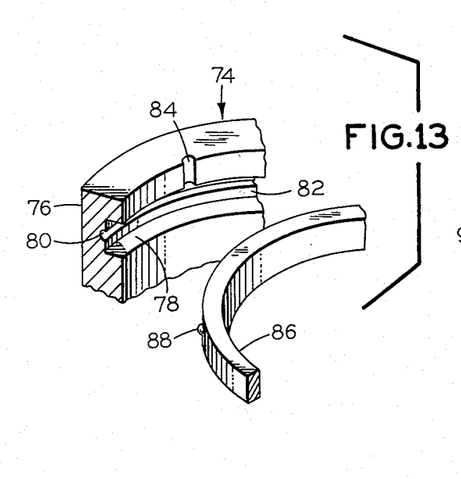
FIG. 13 is an exploded perspective view of a portion of a third embodiment of bearing locking device assembly constructed in accordance with the present invention.

Referring now to FIG. 13 of the drawings, there is illustrated therein a portion of still another embodiment of bearing locking device assembly, generally designated by reference numeral 74, constructed in accordance with the present invention. The bearing locking device assembly 74 consists of a bearing 76 and a locking shoe member 86. Insofar as concerns the construction of the bearing 76, the latter differs from a conventional bearing principally insofar as concerns the embodiment therein of a groove 78 formed in the bore of the bearing 76 in close proximity to one end thereof. The groove 78 is defined by a pair of radially extending substantially planar sidewalls and a bottom surface 82 in which a continuous slot 80 having a generally rounded configuration is provided for a purpose yet to be described. Although perhaps not readily apparent from a reference to FIG. 13, it is to be understood that the groove 78 is eccentric in that the depth thereof varies from a maximum at one side of the bore of the bearing 76 to a minimum on the opposing side of the bore. It will also be noted that the bearing 76 is provided with another rounded slot 84 which extends from one of the end walls of the bearing 76 to the groove 78 thereby providing communication therebetween. The locking shoe member 86 is somewhat similar in construction to the locking shoe member 16. Namely, the thickness of the locking shoe member 86 varies from a maximum at the center thereof to a minimum at each end thereof. In addition, the thickness of the locking shoe member 86 corresponds to the depth of the groove 78 formed in the bore of the bearing 76, i.e., the maximum thickness of the locking shoe member 86 is substantially equivalent to the maximum depth of the groove 78 and the minimum thickness of the locking shoe member 86 is substantially equivalent to the minimum depth of the groove 78. Moreover, although not depicted in FIG. 13 of the drawings in the interest of maintaining clarity of illustration therein, the inner surface of the locking shoe member 86 may be provided with a knurled finish in the same manner as is the inner surface 40 of the locking shoe member 16. Also, in terms of length the locking shoe member 86 corresponds to the locking shoe member 16 in that in each case the length of the respective locking shoe member measured from tip to tip is slightly greater than one-half of the circumference of the groove 78 and the radial shoulder 28, respectively. Notwithstanding the aforedescribed similarities between the locking shoe member 86 and the locking shoe member 16 there nevertheless exists a major difference therebetween insofar as concerns the nature of their constructions. In this regard, instead of being provided with an inclined outer surface like the surface 32 of the locking shoe member 16, the locking shoe member 86 embodies an outer surface which is not inclined but rather is substantially straight from one edge thereof to the other. Moreover, adjacent the center thereof on the outer surface of the locking shoe member 86 there is provided a rounded protuberance 88 which is intended to be cooperable with the slots 80 and 84 in the bearing 76 and accordingly is suitably dimensioned so as to be receivable therein with a sliding fit.

There will next be set forth a description of the manner in which the bearing 76 and the locking shoe member 86 are assembled to form the bearing locking device assembly 74 and the manner in which the latter assembly 74 is intended to be employed to lock the bearing 76 to the shaft 12. The manner in which the bearing 76 and the locking shoe member 86 are assembled is as follows. The protuberance 88 on the locking shoe member 86 is first aligned with the slot 84 in the bearing 76. With the locking shoe member 86 and the bearing 76 so aligned, the protuberance 88 is slid down the slot 84 until it reaches the groove 78. As the locking shoe member 86 is being moved relative to the bearing 76 in the aforedescribed manner, the free ends of the former are biased inwardly to a sufficient extent to permit the ends of the locking shoe member 86 to fit within the bore of the bearing 76. Inasmuch as the width of the locking shoe member 86 corresponds to the width of the groove 78, when the protuberance 88 reaches the groove 78 the locking shoe member 86 snaps into the groove 78 with the protuberance 88 being received within the slot 80 formed in the bottom surface 82 of the groove 78. After the bearing 76 and the locking shoe member 86 have been so assembled to form the bearing locking device assembly 74 of the present invention, the latter assembly 74 is mounted on the shaft 12. To this end, the bore of the bearing 76 corresponds in dimension to the diameter of the shaft 12 whereby the assembly 74 is capable of being slid on to the shaft 12 until the assembly 74 is suitably located thereon so that the desired relationship exists between the assembly 74 and the shaft 12. To lock the bearing 76 on the shaft 12, the former is rotated manually relative to the latter. The rotation of the bearing 76 may be either in a counterclockwise or a clockwise direction. The effect of this rotation is to cause the locking shoe member 86 to be wedged between the bottom surface 82 of the groove 78 in the bearing 76 and the circumference of the shaft 12. As noted above the inner surface of the locking shoe member 86 may be provided with a knurled finish in the manner of the inner surface 40 of the locking shoe member 16 to enhance the gripping action of the locking shoe member 86 relative to the circumference of the shaft 12. For purposes of unlocking the bearing 76 from the shaft 12, the above described procedure is merely reversed.

Figure 14:
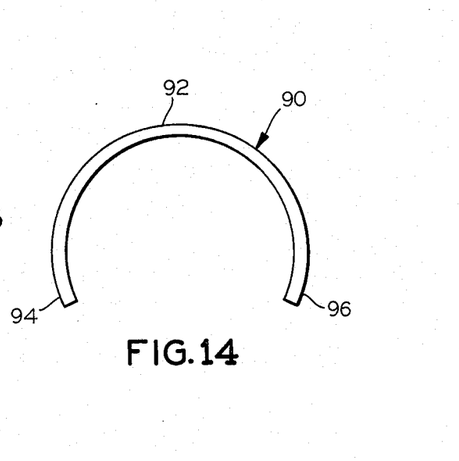
FIG. 14 is an end view of the locking shoe member of a fourth embodiment of bearing locking device assembly constructed in accordance with the present invention.

Turning next to a consideration of FIG. 14 of the drawings, there is illustrated therein the locking shoe member, generally designated by reference numeral 90, of another embodiment of bearing locking device assembly, constructed in accordance with the present invention. The locking shoe member 90 is somewhat similar in construction to the locking shoe member 16. Namely, although not visible in FIG. 14 of the drawings, the outer surface of the locking shoe member 90 is preferably inclined in the manner of the outer surface 32 of the locking shoe member 16 so as to be cooperable with the inclined sidewalls formed in the bore of a bearing (not shown) in the manner of the sidewalls 26 of the bearing 14 so as to permit the locking shoe member 90 and the bearing (not shown) to be cooperatively associated to provide a bearing locking device assembly, constructed in accordance with the present invention. In addition, although not depicted in FIG. 14 of the drawings in the interest of maintaining clarity of illustration therein, the inner surface of the locking shoe member 90 may be provided with a knurled finish in the same manner as is the inner surface 40 of the locking shoe member 16. Moreover, in terms of length the locking shoe member 90 corresponds to the locking shoe member 16 in that in each case the length of the respective locking shoe member measured from tip to tip is slightly greater than ½ of the circumference of the radial shoulder formed in the bore of the bearing in which the locking shoe member is designed to be received. Notwithstanding the aforedescribed similarities between the locking shoe member 90 and the locking shoe member 16 there nevertheless exists a major difference therebetween insofar as concerns the nature of their constructions. In this regard, rather than having the thickest portion thereof provided at the center of the locking shoe member and the thinnest portions at the ends thereof in the manner of the locking shoe member 16, in the locking shoe member 90 the thinnest portion thereof exists at the center 92 and the thickest portions thereof are provided at each end 94 and 96, respectively. Inasmuch as the locking shoe member 90 is intended to be cooperatively assembled with a corresponding suitably configured bearing (not shown) in the same manner as the locking shoe member 16 is associated with the bearing 14, it is not deemed necessary to provide a description herein of the assembly of these components. Likewise, since the bearing locking device assembly resulting from the assembly of the locking shoe member 90 with a suitably configured bearing (not shown) is mounted on the shaft 12 and is operable to perform a locking function relative thereto in the same manner as has been set forth hereinabove in detail in connection with the description of the mounting of the bearing locking device assembly 10 on the shaft 12 and the manner in which the assembly 10 is utilized thereon, it is deemed unnecessary to reiterate at this point the manner in which such a bearing locking device assembly is employed.

For purposes of providing some indication as to the physical dimensions of a bearing locking device assembly constructed in accordance with the present invention, there is set forth hereinafter by way of exemplification some of the dimensions of the bearing 14 and the locking shoe member 16 which together comprise the bearing locking device assembly 10 and the shaft 12 on which the latter assembly 10 is designed to be mounted. Considering first the shaft 12, the latter for purposes of one embodiment of the invention has a diameter of 2 inches. Consequently, the bore 18 of the bearing 14 has a diameter slightly in excess of 2 inches to permit the bearing 14 to be slid on the shaft 12. The sidewalls 26 of the bearing 14 are inclined inwardly at an angle of 15° measured from the horizontal, and for a distance of approximately 3/16 of an inch from the end wall of the bearing 14. The eccentricity of the radial shoulder 28 of the bearing 14 is provided by offsetting the center of the circle described thereby by 0.062 inches from the center of the bore 18 of the bearing 14. Insofar as concerns the locking shoe member 16, the outer surface 32 thereof is inclined inwardly at an angle of 15° measured from the horizontal. Moreover, the width of the locking shoe member 16 is equal to or slightly less than 3/16 of an inch.

Although several embodiments of a bearing locking device assembly constructed in accordance with the present invention have been shown in the drawings and described hereinabove, it is to be understood that still other modifications in the construction thereof may nevertheless be made thereto by those skilled in the art without departing from the essence of the invention. In this connection, some of the modifications which can be made in the bearing locking device assembly have been alluded to hereinabove while others will become readily apparent to those skilled in the art when exposed to the present description and illustration of the construction of the various embodiments of locking shoe members and bearing locking device assemblies. For example, although each of the various locking shoe members depicted in the drawings have been described as embodying an inner surface which is provided with one particular type of finish, it is to be understood that the locking shoe members are not limited to being provided with any one particular type of finish but rather that any of the different types of finishes illustrated in the drawings may be employed therein without departing from the essence of the invention. Moreover, if so desired, the inner surface of the aforementioned locking shoe members may be left unroughened with the locking shoe member still remaining operable to perform its intended function. Moreover, whereas the locking shoe members 16, 42, 48, 54, 60, 86 and 90 have each been described hereinabove as embodying an outer surface having a particular type of configuration, it is to be understood that the aforereferenced locking shoe members are not limited thereto but rather may embody a different type of configuration without departing from the essence of the present invention. As set forth previously hereinabove, the bearing locking device assembly constructed in accord with the present invention is intended to be operable with any conventional form of cylindrical shaft as well as any shaft which embodies at least a portion thereof which is substantially cylindrical in cross section. Also, although the shaft 12 has been described hereinabove as possessing one particular diameter size, it is to be understood that the bearing locking device assembly of the present invention is equally applicable to be employed with shafts which have larger or smaller diameters than that of the shaft 12. The bearing locking device assembly 10 as described hereinabove has been indicated as preferably being provided with index marks in the form of triangles, it is, of course, however to be understood that other different configurations could be employed rather than a triangle for the index marks without departing from the essence of the invention, or the identifying function performed by the triangularly shaped marks could also be provided by some other form of identifying means such as a notch formed in the end wall of the bearing, a slot such as the slot 84, etc. In accord with the preferred embodiment of the invention, the bearing as well as the locking shoe member of the bearing locking device assembly are each made from a suitable metallic material by means of any conventionally known metal forming process. Finally, although not shown in the drawings, suitable openings may be provided in the sidewall of the bearing to provide access therethrough to the locking shoe member when the latter is cooperatively associated with the bearing.

Thus, it can be seen that the present invention provides a novel and improved bearing locking device assembly which is operable for locking a bearing on a shaft. The bearing locking device assembly of the present invention embodies a locking shoe member which is employed to provide the desired locking action. Moreover, in accord with the present invention a bearing locking device assembly is provided wherein a locking shoe member having an inclined outer surface is cooperatively associated with a bearing having a bore in which a groove is formed, the sidewalls of which are inclined at an angle which is the complement of the angle at which the outer surface of the locking shoe member is inclined. Furthermore, a bearing locking device assembly is provided which is compatible for use in mounting bearings on shafts of conventional construction. Also, in accord with the present invention a bearing locking device assembly has been provided which is easy to employ and which enables a bearing which has been locked on a shaft through the use thereof to be readily released from a locked condition relative to the shaft. Finally, a bearing locking device assembly has been provided in accord with the present invention which is capable of effectively locking a bearing on a shaft, yet is relatively inexpensive to manufacture.

I claim:

1. A bearing locking device assembly operable for locking a bearing to a shaft comprising:
   a. a bearing having a pair of end walls and a bore extending therethrough between said pair of end walls, said bore of said bearing having an enlarged portion of greater diameter extending inwardly from one end wall thereof and providing a generally radially extending shoulder in said bore spaced from but in close proximity to said one end wall, said radially extending shoulder being eccentric in shape with the width thereof varying from a maximum at one point therealong to a minimum at another point spaced therefrom, said enlarged portion of said bore being of greatest diameter at a point spaced inwardly from said one end wall; and
   b. a locking shoe member of generally arcuate configuration seated fully within said enlarged portion of said bore, said shoe member having an inner surface curvilinear in shape having a radius corresponding in dimension to the radius of the main portion of said bore of said bearing and an outer surface curvilinear in shape having a radius generally corresponding in dimension to the radius of said radially extending shoulder, said inner surface and said outer surface of said locking shoe member defining a thickness therebetween varying from a maximum dimension at one point greater than the minimum width of said shoulder to a minimum dimension at another point spaced therefrom, said locking shoe member having a configuration cooperating with that of said enlarged portion of in said bore of said bearing and an axial length not greater than that of said enlarged portion to enable said locking shoe member to be fully received within said enlarged portion of said bore and movable circumferentially therewithin between a first position relative thereto wherein there is clearance between its inner surface and the associated shaft for slidably mounting the bearing locking device assembly on a shaft and a second position relative thereto for locking said bearing to the shaft wherein said point of maximum thickness of said locking shoe is wedged tightly between the associated shaft and a section of the enlarged portion of said bore where said shoulder is of reduced width.

2. The bearing locking device assembly as set forth in claim 1 wherein the circumferential wall of said enlarged portion of said bore extending between said one end wall and said radially extending shoulder is inclined inwardly and radially outwardly from said one end wall to said radially extending shoulder to provide a planar surface extending therebetween.

3. The bearing locking device assembly as set forth in claim 2 wherein said outer surface of said locking shoe member is inclined to provide a planar surface with the angle of inclination thereof corresponding to the angle of inclination of said circumferential wall of said enlarged portion of said bore of said bearing.

4. The bearing locking device assembly as set forth in claim 1 wherein the arcuate length of said locking shoe member exceeds in dimension one-half of the circumference of said radially extending shoulder.

5. The bearing locking device assembly as set forth in claim 1 wherein said outer surface of said locking shoe member has an oval configuration axially of said bearing.

6. The bearing locking device assembly as set forth in claim 1 wherein said locking shoe member is a two-part loop consisting of a first section terminating in a pair of ends provided with a first pair of mating surfaces and a second section terminating in a pair of ends provided with a second pair of mating surfaces cooperating with said first pair of mating surfaces of said first section when said pair of ends of said first and second sections are brought into engagement to form an interlocked loop structure.

7. The bearing locking device assembly as set forth in claim 1 wherein the inner and outer surfaces of said locking shoe member are parallel in a direction extending axially of said bearing.

* * * * *